Patented May 22, 1934

1,960,209

UNITED STATES PATENT OFFICE 1,960,209

WATERPROOFING COMPOSITION

William Latimer Holter, Newton, Mass., assignor to Van Schaack Bros. Chemical Works, Inc., Chicago, Ill., a corporation of Illinois No Drawing. Application June 27, 1931, Serial No. 547,455

11 Claims. (Cl. 134—17)

This invention relates to waterproofing compositions in which there is present, in addition to one or more water-repellent substances, a binding agent which will render the compositions, when applied to fabrics or other fibrous materials, resistant to removal by laundering and other cleaning operations.

By the term "waterproof" as used in describing this invention, a condition of imperme- ability to water is not to be understood, but rather one of resistance to wetting by or penetration of water. Thus a waterproof fabric within the meaning of this specification and the appended claims need not be impervious to water supplied, for example, under hydrostatic head, but rather it has the property of causing water with which it may come in contact, or which may be showered upon it, to run off from the surface, substantially without wetting it, and resisting penetration of water through its meshes.

It is an object of this invention to supply a waterproofing composition which when applied, for example, to textile fabrics, will not entirely seal the meshes or interstices between the fibres, but on the other hand will allow the fabric to retain a substantial porosity. It is a further object to provide a waterproofing composition which when applied will not materially change the feel or appearance of the material.

Rubber has long been used to render materials impervious to water, being as a rule spread as a layer over the material or calendered into it and vulcanized, filling the meshes of the material and changing its feel and appearance. When applied in such a manner as not to render the material non-porous, rubber is not suitably water repellent. The addition of minor amounts of certain substances which are water repellent, which is common in rubber compounding practice, does not overcome this deficiency.

In carrying out this invention suitable water repellent substances in major amounts are incorporated with minor amounts of rubber together with other substances to be described later. By a water-repellent substance is meant one which possesses to a high degree the property of "negative capillarity", that is one which has such interfacial relations in contact with water that its surface is not wet and the water runs off without leaving an adherent film of substantial dimension. Examples of such water repellent substances are a large variety of substantially solid waxy materials such as paraffin, ceresin, chlorinated naphthalenes, carnauba wax, beeswax, spermaceti, the metallic salts or soaps of the higher fatty acids, for example, aluminum, zinc, magnesium, or cerium palmitates, stearates, oleates, myristates and the like.

The compositions of this invention may be applied in the form of solutions or dispersions of the ingredients in a medium, any liquids capable of dissolving or dispersing the ingredients without mutual precipitation being suitable for the purpose. The medium should be sufficiently volatile that it may evaporate from surfaces to which the composition may be applied in a reasonable time, at atmospheric or moderately elevated temperatures. Illustrative examples are benzol, toluol, cleaners' naphtha, gasoline, carbon tetrachloride, or mixtures of these. Other constituents such as alcohols, ketones, ethers, and/or esters may be included in such amounts that they do not cause undue precipitation of the solid ingredients.

The word "solution" as used in describing this invention is meant to include colloidal solutions, suspensions and dispersions, as well as true solutions.

With the rubber is incorporated sulfur or other vulcanizing agent, a number of which are well- known in the art, a vulcanization accelerator capable of causing self-curing, that is, vulcanization at atmospheric temperatures, and an organic base of such low volatility that it will not evaporate readily from a thin film of material such as results from the application of the compositions of this invention to surfaces of material. When the waterproofing solution deposits its solids by evaporation of the liquid medium on a surface to be waterproofed, the rubber therein becomes vulcanized by the ingredients above named in the course of a few minutes or at most a few days, depending on the temperature. The waterproofing solids thereby become resistant to removal by laundering or cleaning agents. Other constituents than those named, commonly employed in the art, may be incorporated with the rubber and remain within the purview of this invention.

The following is an illustrative example of one method by which a composition such as is contemplated in this invention may conveniently be prepared.

EXAMPLE 1

A dispersion or gel of aluminum stearate is made by heating the aluminum stearate with hydrocarbon solvents to about 70° C. for a time, and then cooling. The following proportions are suitable.

Solution A

| | Parts by weight |
|---|---|
| Aluminum stearate | 4 |
| Benzol | 58 |
| Cleaners' naphtha 58° Bé | 50 |

Two solutions or dispersions comprising, when mixed, a self-curing rubber composition are made by milling or working together the following ingredients in about the proportions by weight shown.

Solution B

| | Parts |
|---|---|
| First grade latex crepe rubber | 900 |
| Zinc oxide | 50 |
| Zinc stearate | 18 |
| Sulfur | 36 |
| Benzol or naphtha | 2386 |

Solution C

| | Parts |
|---|---|
| First grade latex crepe rubber | 900 |
| Zinc oxide | 50 |
| Zinc stearate | 18 |
| Zimate accelerator (zinc dimethyl dithiocarbamate) | 12 |
| Dibenzylamine | 12 |
| Benzol or naphtha | 2398 |

Solution A is then combined with a portion of each of Solutions B and C in such proportion that the amount of aluminum stearate in each of the combined solutions is substantially greater than the amount of rubber.

Solution D

| | Parts by weight |
|---|---|
| Solution A | 240 |
| Solution B | 10 |
| Benzol | 390 |

Solution E

| | Parts by weight |
|---|---|
| Solution A | 240 |
| Solution C | 10 |
| Benzol | 390 |

Shortly before applying to the material to be waterproofed Solutions D and E are thoroughly mixed in substantially equal proportions. In the example given above the ratio of aluminum stearate to rubber is 3.4:1. Other proportions may be used; a ratio of 2:1 or 5:1 is suitable, or as in the following:

Example 2

The two final solutions may consist of:

Solution $D_2$

| | Parts by weight |
|---|---|
| Solution A | 350 |
| Solution B | 10 |
| Benzol | 280 |

Solution $E_2$

| | Parts by weight |
|---|---|
| Solution A | 350 |
| Solution C | 10 |
| Benzol | 280 | which are then mixed together shortly before application.

If desired either of the two final solutions may be made without the presence of any water-repellent substance, with a corresponding increase in the amount present in the other, or the amounts may be different in the two solutions.

Example 3

Solution $D_3$

| | Parts by weight |
|---|---|
| Solution A | 480 |
| Solution B | 10 |
| Benzol | 390 |

Solution $E_3$

| | Parts by weight |
|---|---|
| Solution C | 10 |
| Benzol | 390 |

These are combined as in Example 1.

Likewise the concentration of rubber shown in Example 1, Solutions C and D may vary between wide limits. Different accelerators may be employed, for example zinc ethyl dithiocarbamate, piperidine pentamethylene dithiocarbamate, zinc alkyl xanthates and the like. For the dibenzylamine may be substituted other organic bases of low volatility such as piperidine, or aniline. Other materials which may serve as antioxidants may be included. Different proportions of all the above mentioned materials may be employed. For the aluminum stearate of Solution A other water repellent substances, examples of which have been given, may be substituted, or mixtures of these may be used. Other rubber-like materials such as gutta percha or balata may be employed in place of rubber wholly or in part in some instances. This invention is not confined to the particular mode or order of mixing the ingredients or to the specific proportions or materials shown in the examples. Thus, under some circumstances, particularly when the composition is for immediate use, all the ingredients may be combined at once into one solution, taking care not to allow curing of the rubber to take place before applying. The ratio of solids to liquid medium in the composition may be increased or diminished according to the use to which the composition is to be put, or the method of its application. The addition of drying or semi-drying oils is useful in some modifications and is not precluded.

Compositions of the sort described are useful in combination with porous or fibrous materials to retard the penetration of water. The materials may be immersed in solutions of the compositions, or such solutions may be brushed, sprayed or otherwise coated on the material to be treated. By evaporation of the solvents the composition remains on the material in the form of a thin, porous film, comprising the water repellent substance and the self-curing rubber binding material, afterwards becoming cured, enveloping the fibres or granules of the surface treated but not completely filling the interstices. In some cases the fibres may become impregnated with the deposited solids. The compositions may be applied to wood, paper, textile fabrics, porous stone, concrete and the like, rendering them waterproof.

The following example illustrates a method of treating cloth with the composition described in Example 1.

Solutions D and E are mixed thoroughly and the cloth is immersed at once in the mixture passing through at a rate of about 150 ft. per minute. After leaving the solution, the cloth passes between rolls of vegetable composition, such as printers' rolls, which are set at 15 lbs. pressure. Following this the solvent is removed either by natural evaporation or by accelerated methods such as a tunnel drier, and the fabric is then ironed or calendered at a temperature of say 250° F. If desired, this or some other moderately elevated temperature may be maintained for a longer time to accelerate the curing of the rubber, since this composition cures in 15 minutes at 275° F., requiring five days at room temperature. Moderately elevated temperatures, intermediate between these two, accelerate the cure substantially proportionately.

By the term "vulcanizing agent-vulcanization accelerator system" as used in the claims is meant a system comprising essentially two members: A vulcanizing agent and an accelerator, such as those before described, suitably proportioned relative to each other and to the rubber with which they are used, as is well known in the art. The presence of promoters, antioxidants and other accessory materials is not precluded.

I claim:

1. A waterproofing composition comprising in solution rubber, a vulcanizing agent therefor, a vulcanization accelerator, and a metallic salt of a higher fatty acid, the ratio of said metallic salt to said rubber lying between the limits of 2:1 and 5:1.

2. A waterproofing composition comprising in solution rubber, a vulcanizing agent therefor, a vulcanization accelerator, and aluminum stearate, the ratio of said aluminum stearate to said rubber lying between the limits of 2:1 and 5:1.

3. A waterproofing composition comprising in solution a water-repellent substance and rubber in a ratio between the limits of 2:1 and 5:1; a vulcanizing agent for the rubber, and a vulcanization accelerator, the vulcanizing agent being in a separate solution from the accelerator and organic base; the two solutions on admixture yielding a self-curing rubber composition.

4. A waterproofing composition comprising in solution aluminum stearate and rubber in a ratio between the limits of 2:1 and 5:1; a vulcanizing agent for the rubber, and a vulcanization accelerator, the vulcanizing agent being in a separate solution from the accelerator and organic base; the two solutions on admixture yielding a self-curing rubber composition.

5. A waterproofing composition comprising, in solution, a metallic salt of a higher fatty acid, rubber, a vulcanizing agent therefor, a vulcanization accelerator, and a substance selected from the group consisting of dibenzylamine, aniline, piperidine; the ratio of said metallic salt to said rubber lying between the limits 2:1 and 5:1.

6. A waterproofing composition comprising, in solution, a water-repellent substance and rubber in a ratio between the limits 2:1 and 5:1, a vulcanizing agent, a vulcanization accelerator and a substance selected from the group consisting of dibenzylamine, aniline, piperidine; the vulcanizing agent being in a separate solution from the accelerator and organic base; the two solutions on admixture yielding a self-curing rubber composition.

7. A waterproofing composition comprising, in solution, aluminum stearate and rubber in a ratio between the limits 2:1 and 5:1, a vulcanizing agent, a vulcanization accelerator and a substance selected from the group consisting of dibenzylamine, aniline, piperidine; the vulcanizing agent being in a separate solution from the accelerator and organic base; the two solutions on admixture yielding a self-curing rubber composition.

8. A solution suitable for waterproofing containing one member of a vulcanizing agent-vulcanization accelerator system, rubber and a water-repellent substance, the proportion of water-repellent substance being greater relative to the rubber, which solution when added to another solution miscible with the first and containing the other member of the vulcanizing agent-vulcanization accelerator system, yields a self-curing rubber composition.

9. A solution suitable for waterproofing containing one member of a vulcanizing agent-vulcanization accelerator system, rubber and a waxy substance, the proportion of waxy substance being greater relative to the rubber, which solution when added to another solution miscible with the first and containing the other member of the vulcanizing agent-vulcanization accelerator system, yields a self-curing rubber composition.

10. A solution suitable for waterproofing containing one member of a vulcanizing agent-vulcanization accelerator system, rubber and aluminum stearate, the proportion of aluminum stearate being greater relative to the rubber, which solution when added to another solution miscible with the first and containing the other member of the vulcanizing agent-vulcanization accelerator system, yields a self-curing rubber composition.

11. A solution suitable for waterproofing containing one member of a vulcanizing agent-vulcanization accelerator system, rubber and a water-repellent substance, the proportion of water-repellent substance being between the ratios of 2:1 and 5:1 relative to the rubber, which solution when added to another solution miscible with the first and containing the other member of the vulcanizing agent-vulcanization accelerator system, yields a self-curing rubber composition.

WILLIAM LATIMER HOLTER.